United States Patent
Watanabe et al.

(10) Patent No.: US 8,580,069 B2
(45) Date of Patent: Nov. 12, 2013

(54) PLASTIC BONDING METHOD

(75) Inventors: Tatsufumi Watanabe, Ibaraki (JP); Junichi Tanaka, Ibaraki (JP); Atsushi Nagasawa, Ibaraki (JP); Shinji Hiramatsu, Ibaraki (JP); Katsuya Fujisawa, Ibaraki (JP)

(73) Assignee: Kuraray Co., Ltd., Kurashiki-shi (JP)

( * ) Notice: Subject to any disclaimer, the term of this patent is extended or adjusted under 35 U.S.C. 154(b) by 975 days.

(21) Appl. No.: 10/546,863

(22) PCT Filed: Mar. 8, 2004

(86) PCT No.: PCT/JP2004/002983
§ 371 (c)(1),
(2), (4) Date: Jul. 10, 2008

(87) PCT Pub. No.: WO2004/078460
PCT Pub. Date: Sep. 16, 2004

(65) Prior Publication Data
US 2006/0237128 A1 Oct. 26, 2006

(30) Foreign Application Priority Data

Mar. 7, 2003 (JP) .................................. 2003-061444
Mar. 7, 2003 (JP) .................................. 2003-061445

(51) Int. Cl.
*B29C 65/00* (2006.01)

(52) U.S. Cl.
USPC .................. 156/272.8; 156/275.1; 156/309.9; 156/322

(58) Field of Classification Search
USPC .......... 156/272.2, 272.8, 273.3, 275.1, 308.2, 156/309.9, 322, 290, 292, 308.4; 349/65
See application file for complete search history.

(56) References Cited

U.S. PATENT DOCUMENTS

| | | | | |
|---|---|---|---|---|
| 3,560,291 A | * | 2/1971 | Foglia et al. | 156/229 |
| 4,417,948 A | * | 11/1983 | Mayne-Banton et al. | 216/65 |
| 5,035,045 A | * | 7/1991 | Bowen et al. | 29/623.2 |
| 5,286,327 A | * | 2/1994 | Swartz | 156/273.3 |

(Continued)

FOREIGN PATENT DOCUMENTS

| | | |
|---|---|---|
| EP | 0 467 096 A1 | 1/1992 |
| JP | 1-286212 | 11/1989 |

(Continued)

OTHER PUBLICATIONS

Klaassen, Curtis D., Casarett & Doull's Toxicology—The Basic Science of Posons 2001, 6th Edition, p. 918.*

(Continued)

*Primary Examiner* — John Goff
(74) *Attorney, Agent, or Firm* — Oblon, Spivak, McClelland, Maier & Neustadt, L.L.P.

(57) ABSTRACT

To provide a method of bonding two materials directly with each other, at least one of which is made of a plastic material, which method is applicable to bonding two materials, with no need to use any bonding agent and without allowing the materials to be exposed to high temperature and/or high pressures. In this method in which a first member made of a plastic material and a second member are bonded together, one surface of the first member to be bonded with the second member is irradiated with energy rays having a quantity of energies not lower than 4 eV, followed by directly bonding the first and second members together without any bonding agent being used.

12 Claims, 1 Drawing Sheet

(56) References Cited

U.S. PATENT DOCUMENTS

| | | | |
|---|---|---|---|
| 5,396,350 A | | 3/1995 | Beeson et al. |
| 5,522,954 A | * | 6/1996 | Bennett et al. ............... 156/64 |
| 5,628,859 A | * | 5/1997 | Janin et al. ............... 156/273.3 |
| 5,914,760 A | * | 6/1999 | Daiku ............... 349/65 |
| 6,086,212 A | * | 7/2000 | Onishi et al. ............... 362/621 |
| 6,451,152 B1 | * | 9/2002 | Holmes et al. ............ 156/272.8 |
| 6,838,156 B1 | | 1/2005 | Neyer et al. |
| 7,952,802 B2 | * | 5/2011 | Tanabe et al. ............ 359/483.01 |
| 2001/0053074 A1 | * | 12/2001 | Onishi et al. ............... 362/31 |

FOREIGN PATENT DOCUMENTS

| | | |
|---|---|---|
| JP | 4-55438 | 2/1992 |
| JP | 4-232741 | 8/1992 |
| JP | 7-17762 | 3/1995 |
| JP | 7-101004 | 4/1995 |
| JP | 7-330920 | 12/1995 |
| JP | 2000-249836 | 9/2000 |
| JP | 2000-266932 | 9/2000 |
| JP | 2001-162645 | 6/2001 |
| JP | 2001-162723 | 6/2001 |
| JP | 2001-357709 | 12/2001 |
| JP | 2001356208 A * | 12/2001 |
| JP | 2002-316362 | 10/2002 |
| WO | WO 00/02723 * | 1/2000 |
| WO | WO 01/21384 A1 | 3/2001 |
| WO | WO 02/090112 * | 11/2002 |

OTHER PUBLICATIONS

Machine translation of JP 2001356208.*
Appeal Decision issued Jun. 29, 2012 in Korean Patent Application No. 10-2010-7018702 (with partial English-language translation).
Decision of Reexamination issued Jul. 2, 2012 in Chinese Patent Application No. 200480005833.1 (with partial English-language translation).
Office Action issued Sep. 13, 2012 in European Patent Application No. 07 112 115.6.
Office Action issued Feb. 20, 2007, in Japanese Patent Application No. 2003-061445 (with English-language translation).
Office Action issued Jan. 17, 2007, in European Patent Application No. 04 718 440.3.
Office Action issued Aug. 29, 2007, in European Patent Application No. 04 718 440.3.
Office Action issued Feb. 1, 2008, in European Patent Application No. 04 718 440.3.
Extended European Search Report issued Feb. 11, 2008, in Patent Application No. 07112115.6.
Office Action issued Jun. 25, 2010, in Korean Patent Application No. 10-2005-7016435 (with partial English-language translation).
Office Action issued Dec. 3, 2010, in Korean Patent Application No. 10-2010-7018702 (with partial English-language translation).
Office Action issued Sep. 26, 2011, in Korean Patent Application No. 10-2010-7018702 (with partial English-language translation).
Office Action issued Sep. 22, 2006, in Chinese Patent Application No. 200480005833.1 (with partial English-language translation).
Office Action issued Jul. 25, 2008, in Chinese Patent Application No. 200480005833.1 (with partial English-language translation).
Office Action issued Jun. 5, 2009, in Chinese Patent Application No. 200480005833.1 (with partial English-language translation).
Office Action issued Nov. 9, 2011, in Chinese Patent Application No. 200480005833.1 (with partial English-language translation).
Office Action issued Dec. 8, 2010, in Taiwanese Patent Application No. 093105791 (with partial English-language translation).

* cited by examiner

PLASTIC BONDING METHOD

BACKGROUND OF THE INVENTION

1. Field of the Invention

The present invention generally relates to a method of accomplishing bonding without using any bonding agent and, more particularly, to the method of bonding a first member, made of a plastic material, with a second member which may be made of glass, ceramics, metallic material including alloys, plastic material, wood or the like.

2. Description of the Prior Art

Bonding of a plastic member with other member of any material has hitherto and is currently required the use of a bonding agent. The bonding agent for this purpose is nowadays available in various types: room temperature curing type such as, for example, solvent dry bonding agent, catalyst added bonding agent, wet hardening adhesive, anaerobic adhesive, and instant adhesive, thermosetting adhesive, ultraviolet cure adhesive, hot-melt adhesive, remoistening adhesive and pressure sensitive adhesive and so on. Depending on the affinity between members to be bonded together and/or the purpose of bonding, the specific bonding agent is generally utilized to achieve an intended bond.

However, depending on the member to be bonded with a plastic member and/or the application of molded articles, the need is generally recognized to avoid the use of any bonding agent in accomplishing a bonding between the plastic member and the second member of any material in order to pursue the intended chemical resistance, heat resistance, dimensional stability, electric characteristic and/or optical characteristic.

The Japanese Laid-open Patent Publication No. 4-55438, for example, discloses formation of a stack of laminates with or without bonding layers after the bond performance has been increased by irradiating films of poly-parabanic acid. However, where no bonding layer is employed, the technique disclosed therein is applicable only to laminates each having an adhesive property and, therefore, the use of a bonding agent is essential where the laminates having no adhesive property are to be stacked together.

The Japanese Laid-open Patent Publications No. 2001-162645 and No. 2001-162723, for example, discloses a method of bonding a rubber composition and a polyamide material together. According to those patent publications, after the rubber composition has been subjected to the ultraviolet irradiation treatment, the plasma treatment, or the corona discharge treatment, in order for the rubber composition to be bonded with the polyamide material with no bonding agent being used, the polyamide material must be held in a molten state before it is bonded with the rubber composition and, therefore, the technique disclosed therein is incapable of being applied to bonding of materials sensitive to heat.

Discussing by way of a specific material to be bonded, in the planar light source device (for backlighting apparatus such as disclosed in the U.S. Pat. No. 5,396,350) including a light guide element and a microprism arrayed film (optical film), both made of a plastic material, are required to be bonded together to thereby provide integral members for a planar light source device. However, the use of any bonding agent or adhesive film (See the Japanese Laid-open Patent Publications No. 2000-249836 and No. 2001-357709), the integral members for the planar light source device is incapable of being fabricated in a thin-walled structure. Since increase of the thickness of the planar light source device by a quantity corresponding to the thickness of one or more bonding layers results in lowering of the light transmittance and since the manufacturing cost of the planar light source device tends to be incurred as a result of increase of the number of process steps, the need has arisen and is recognized to provide a method of directly bonding the light guide element and the microprism arrayed film together without any bonding agent being used.

The bonding method that does not require the use of any bonding agent is not in non-existence in the art. For example, the Japanese Laid-open Patent Publication No. 2001-356208 discloses a technique of fabricating a film having an array of microprisms with the use of a specific material capable of exhibiting an adhesive property when such material is treated with an ionization radiation. This technique disclosed therein is applicable where the special plastic material is used for the microprism arrayed film and is therefore susceptible to increase in manufacturing cost where no special plastic material is used.

SUMMARY OF THE INVENTION

In view of the foregoing, the present invention has been developed with a view to substantially eliminating the problems and inconveniences inherent in the prior art techniques and is intended to provide a bonding method applicable to bonding two materials directly, provided that at least one of them is a plastic material, without any bonding agent employed.

Another important object of the present invention is to provide a bonding method of the kind referred to above, wherein the materials to be bonded together need not be exposed to high temperatures and high pressures during the bonding thereof with no bonding agent used.

The inventors of the present invention have conducted a series of extensive researches in an attempt to substantially eliminate or minimize the problems and inconveniences inherent in the prior art techniques discussed above and have successfully found that irradiation of a plastic material with energy rays having a quantity of energies not lower than 4 eV is effective to allow such plastic material to exhibit a sufficient self-bonding property or adhesive property, thus making it possible to bond the plastic material with any material without any separate bonding agent used. The present invention is based on this finding.

More specifically, according to a broad aspect of the present invention, there is provided a plastic bonding method for bonding a first member, made of a plastic material, and a second member together. This plastic bonding method includes a step of irradiating one of opposite surfaces of the first member, that is to be bonded with the second member, with energy rays having a quantity of energies not lower than 4 eV and a step of directly bonding the first and second members together without any bonding agent being used.

According to the present invention, since irradiation of the energy rays is effective to provide the first member, made of a plastic material, with a sufficient self-bonding property or adhesive property and, accordingly, without the bonding agent used, the first and second members can be sufficiently and effectively bonded together directly. Unlike contact bonding, thermo compression bonding and fusion bonding where pressure and/or heat are employed, none of the first and second members is exposed to high temperature and/or high pressure in the practice of the present invention and, therefore, the plastic bonding method of the present invention can be advantageously and effectively applied to the bonding of a wide range of materials susceptible of pressure and/or heat. Also, since the plastic material forming the first member may not be limited to a special kind and may be chosen from a wide range of plastic materials, the plastic bonding method of the present invention can find a variety of applications without substantially incurring an undesirable increase in cost.

In one preferred embodiment, the second member to be bonded with the first member made of the plastic material may be a plastic material.

In another preferred embodiment of the present invention, irradiation of the energy rays having a quantity of energies not lower than 4 eV may also be effected to one of the opposite surfaces of the second member that is to be bonded with the first member.

In the practice of the present invention, neither the first member nor the second member may have a self-bonding or adhesive property prior to irradiation of the energy rays, but the first member can have a self-bonding or adhesive property when irradiated by the energy rays.

Also, in the practice of the present invention, the energy rays may be selected from the group consisting of ultraviolet rays, corona discharge, electron beams and ion beams. In particular, of those energy rays, ultraviolet rays are preferred, but the ultraviolet rays emitted from an irradiation lamp chosen from the group consisting of a $D_2$ lamp, a high pressure mercury lamp, a low pressure mercury lamp, an Xe (xenon) lamp, a Hg—Xe lamp, a halogen lamp and an excimer lamp are more preferred.

When the first and second members are to be bonded together, the first member may be preheated prior to the irradiation of the energy rays or, alternatively, the irradiation of the energy rays may be effected while the first member is being heated.

In a further preferred embodiment of the present invention, during irradiation of the energy rays, that surface of the first member to be bonded with the second member may be exposed to the atmosphere or may be held in contact with at least one kind of gaseous medium selected from the group consisting of oxygen, nitrogen, ozone, water vapor and ammonium.

In a still further preferred embodiment of the present invention, during the irradiation of the energy rays, that surface of the first member to be bonded with the second member may be held in contact with a liquid medium which includes one material selected from the group consisting of water, hydrogen peroxide, ammonium, alcohols, organic acid, derivatives of the organic acid, nitriles, amines and sulfur compounds.

In another broad aspect of the present invention, the present invention encompasses a method of making integral members for a planar light source device. Specifically, where the second member to be bonded with the first member made of the plastic material may be a plastic material as discussed above, the first member may be a light guide element for propagating rays of light from a light source towards a light exit surface thereof and the second member may be an optical film disposed on the light exit surface of the light guide element. In this planar light source device, a plurality of projections operable to transmit rays of light from the light exit surface of the light guide element towards a front surface region of the light exit surface are formed on one of opposite surfaces of the optical film that confronts the light guide element. The plastic bonding method of the present invention is, within the context of the integral members for the planar light source device making method, utilized to bond the light guide element directly with the optical film at vertexes of the plural projections.

Alternatively, where the second member to be bonded with the first member made of the plastic material may be a plastic material as discussed above, the second member may be a light guide element for propagating rays of light from a light source towards a light exit surface thereof and the first member may be an optical film disposed on the light exit surface of the light guide element. In this planar light source device, a plurality of projections operable to transmit rays of light from the light exit surface of the light guide element towards a front surface region of the light exit surface are formed on one of opposite surfaces of the optical film that confronts the light guide element. As such, within the context of integral members for the planar light source device making method, the plastic bonding method of the present invention can be utilized to bond the light guide element directly with the optical film at vertexes of the plural projections.

Also, where the second member to be bonded with the first member made of the plastic material may be a plastic material as discussed above, and where irradiation of the energy rays having a quantity of energies not lower than 4 eV is effected not only to one of opposite surfaces of the first member, that is to be bonded with the second member, with energy rays having a quantity of energies not lower than 4 eV, but also to one of the opposite surfaces of the second member that is to be bonded with the first member as discussed above, the first member may be a light guide element for propagating rays of light from a light source towards a light exit surface thereof and the second member may be an optical film disposed on the light exit surface of the light guide element. In this planar light source device, a plurality of projections operable to transmit rays of light from the light exit surface of the light guide element towards a front surface region of the light exit surface are formed on one of opposite surfaces of the optical film that confronts the light guide element. Even in this case, within the context of integral members for the planar light source device making method, the plastic bonding method of the present invention can be utilized to bond the light guide element directly with the optical film at vertexes of the plural projections.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE EMBODIMENTS

Figure 1:
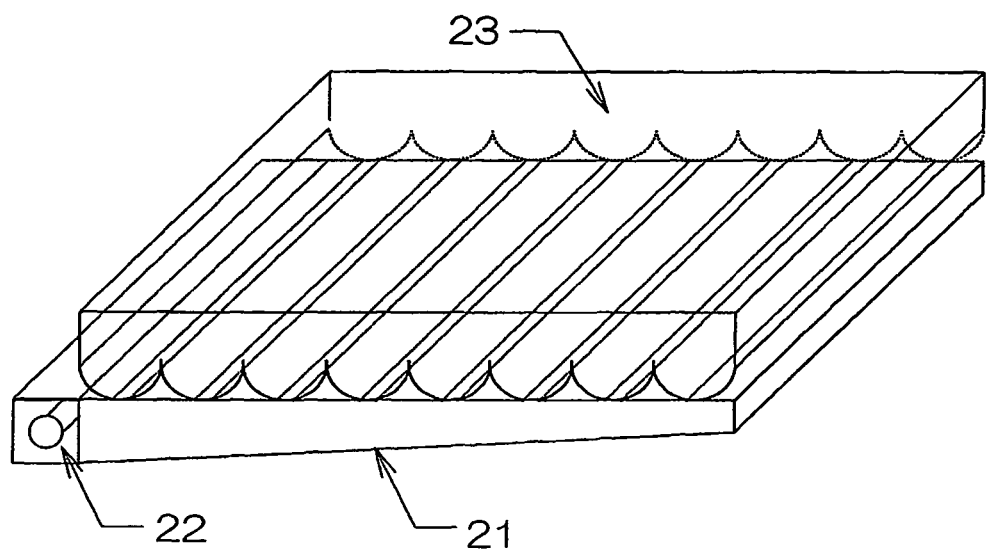
FIG. 1 is a schematic perspective view of integral members for a planar light source device embodying the present invention.

In the practice of the present invention, any other material representing the second member that is bonded with a plastic material forming the first member is preferably in the form of a plastic material, but any of glass, at least one of ceramics, wood, and one of metallic materials including alloys, that are different than plastic materials may be employed therefore. Also, where plastic materials are desired to be bonded together, the both may be of the same kind or composition or of the different kind or composition.

Energy rays may be applied only to the first member made of a plastic material, but may also be applied to both the first member and the second member made of a plastic material, a glass material, a ceramic material, a wood material or a metallic material including an alloy. Also, different energy rays may be applied in the same or different atmospheres to respective mating surfaces of the first and second members that are to be bonded with each other.

In addition, prior to the irradiation of the energy rays, the first member made of a plastic material and the second member made of a plastic material, a glass material, a ceramic material, a wood material or a metallic material including an alloy, both employed in the practice of the present invention may have neither a self-bonding property nor an adhesive property, but may have a self-bonding property or an adhesive property insufficient to accomplish an immediate bonding between the first and second members.

When the first member is heated prior to and/or during irradiation of the energy rays, the length of time required to perform the irradiation of the energy rays can advantageously and effectively be reduced. If desired, the second member may also be heated prior to and/or during irradiation of the energy rays.

In the practice of the present invention, the temperature at which the first and second members are to be bonded together is preferably room temperature, but one or both of the first and second members may be heated to such an extent that the respective mating surfaces thereof will not be melted or fused prior to bonding.

The energy rays employed in the practice of the present invention may be selected from the group consisting of ultraviolet rays, electron beams and ion beams and must be applied in a quantity of energies not lower than 4 eV and preferably not lower than 7 eV. If the quantity of energies is not lower than 4 eV, the molecular bond such as C—C bond and C—H bond can easily be broken up. In other words, if the energy rays to be irradiated have the quantity of energies lower than the lowermost limit of 4 eV, the molecular bond such as C—C bond and C—H bond will not be broken up and, therefore, no sufficient self-bonding or adhesive property will be manifested. Of the energy rays that can be employed in the practice of the present invention, the ultraviolet rays may be emitted from a UV source such as an laser oscillator including, for example, an excimer laser, $Ar^+$ laser, $Kr^+$ laser and $N_2$ laser, or a UV lamp including, for example, a $D_2$ lamp, a high pressure mercury lamp, a low pressure mercury lamp, an Xe lamp, a Hg—Xe lamp, a halogen lamp, an excimer lamp, a discharge lamp such as, for example, a silent electric discharge, a corona discharge or an arc discharge effected under the atmosphere rich of air, nitrogen or any other gaseous medium. Of them, on account of the balance of the energy, strength and irradiation coverage of the energy rays, the use can be suitably made of the UV lamp such as a $D_2$ lamp, a high pressure mercury lamp, a low pressure mercury lamp, an Xe lamp, a Hg—Xe lamp, a halogen lamp or an excimer lamp.

During the irradiation of the energy rays, a surface of the plastic material may be exposed to the atmosphere or may be held in contact with at least one kind of gaseous medium selected from the group consisting of oxygen, nitrogen, ozone, water vapor and ammonium, but the gaseous medium that can be employed may not be always limited thereto.

During the irradiation of the energy rays, that surface of the plastic material may be held in contact with a liquid medium which includes one material selected from the group consisting of water, hydrogen peroxide, ammonium, alcohols, organic acid, derivatives of the organic acid, nitriles, amines and sulfur compounds. However, the liquid medium used for this purpose may not be always limited to those enumerated above.

If the irradiation of that surface of the plastic material with the energy rays is carried out under the atmosphere containing air, oxygen, ozone, water vapor or the like, under the atmosphere containing a gaseous organic matter such as, for example, ammonium, hydrazine or the like, or in a bath of an organic solvent such as, for example, water, hydrogen peroxide, alcohol, amine or the like, the capability of disconnecting the C—H bond, C—C bond or the like present on the surface of the plastic material and the functional group such as, for example, the hydroxyl function, the amino function, ketone, aldehyde, carboxyl or the like can be formed in the surface of the plastic material by the action of a carbon component, an oxygen component, a nitrogen component and/or a water component contained in the atmosphere. Accordingly, irradiation of the plastic material with the energy rays under such atmosphere is feasible because the surface of the plastic material can come to have a hydrophilic property.

Also, depending on conditions including the atmosphere under which the energy rays are irradiated and the length of time of irradiation, not only can disconnection of the C—H bond, the C—C bond or the like in the plastic material be advantageously enhanced, but oligomer, a low molecular compound or the like and surface irregularities can also be formed on the surface of the plastic material to such an extent as to manifest the self-bonding or adhesive property effectively. However, the conditions that can be employed in the practice of the present invention vary depending on the material of the members to be bonded with each other and the type of the energy rays employed.

The plastic material that can be employed for one or both of the first and second members may be of a kind which such plastic material as manufactured has neither a self-bonding property nor an adhesive property, but can develop the self-bonding property or the adhesive property only when irradiated with the energy rays. By way of example, examples of such plastic material include, although not exclusively limited thereto, polyamide, polyester, engineering plastics, polyolefine, polystyrene resin, polyvinyl resin, cellulose resin and the like. Also, a blended material or an alloy in which various plastic materials and fillers are dispersed can also be employed for the plastic material.

The first and/or second members to be bonded with each other may take any suitable or desired form. For example, one or both of the first and second members may be in the form of a film, a sheet, a fiber, a resin molded form or any other form and may not necessarily take the form of a final product and may be of any shape. Specifically, the surface of each or both of the first and second members that is to be bonded with the other may not be always limited to a flat shape and may be of any suitable or arbitrarily chosen shape.

Hereinafter, the present invention will be demonstrated by way of examples in connection with the plastic bonding method. It is, however, to be noted that those examples are not intended to limit the scope of the present invention, but are intended to provide only for illustration purpose. It is also to be noted that in each of the following inventive examples and comparative examples, the adhesive property was evaluated by means of the 90° peel strength test. This 90° peel strength test will first be discussed with particular reference to FIG. 2.

First and second samples of a predetermined width, which are to be bonded with each other and which correspond respectively to the first and second members referred to above, were prepared for the test purpose in each of the inventive and comparative examples. On the occasion of the peel strength test, the second sample 2 was placed on a movable table 11 of a adhesion measuring apparatus. The second sample so placed may be in the form of either a flexible film or an inflexible sheet.

On the other hand, the first sample 1 is secured to a peeling jig 12 of the adhesion measuring apparatus. This peeling jig 12 is operatively coupled with a pulling arm 15 through a load cell 13 so that the tensile stress (adhesive strength) can be measured during exfoliation. During this measurement, the pulling speed was set to 300 mm/min in each of the inventive and comparative examples. Since the movable table 11 is connected with the pulling arm 15 through a connecting element 14 such as, for example, a string, the movable table 11 can move leftwards, as viewed in FIG. 2, a distance equal to the distance over which the peeling jig 12 is moved upwardly. Accordingly, the first sample 1 can be peeled at a peel angle of 90° at all times during the measurement relative to the second sample 2.

Example 1

In this Example, as a source of energy rays, a commercially available xenon lamp, tradenamed "UER 200/HM172" manufactured by and available from USHIO U-TECH INC. and capable of emitting energies of 7.3 eV, was used. For the first member, a vinylon film, tradenamed "Vinylon Film #3000" manufactured by and available from Kuraray Co., Ltd., was used and for the second member, a polyethylene terephthalate film, tradenamed "COSMOSHINE A4300" manufactured by and available from Toyobo. Co., Ltd, was used. Using this energy ray source and the materials, the vinylon film and the polyethylene terephthalate film, both spaced 2 mm from the energy rays source, were irradiated with ultraviolet rays of 10 mW/cm$^2$ emitted from the xenon lamp for 200 seconds.

Subsequently, the vinylon film and the polyethylene terephthalate film were laminated by the application of a laminating pressure of 0.3 kgf/cm$^2$ (0.03 MPa) to bond them together, followed by measurement of the adhesive strength of the resultant laminate by means of the 90° peel strength test. As a result thereof, the adhesive strength of the film of 100 mm in width after the irradiation with the energy rays was found to be 1.28 kgf (13 N) and it has thus been found that the films could be satisfactorily bonded together without any bonding agent employed.

Example 2

Using an injection molded plate of methacrylate resin, tradenamed "PARAPET GH-S" manufactured by and available from Kuraray Co., Ltd., as the second member and a polycarbonate film, tradenamed "Iupilon film" manufactured by and available from Mitsubishi Engineering-Plastics Corporation, as the first member, the energy rays were irradiated in a manner substantially identical with that in Example 1 to bond them together. Measurement after the energy ray irradiation has indicated that the adhesive strength of the film of 100 mm in width was 0.12 kgf (1.2 N), and it has thus been found that the films could be satisfactorily bonded together without any bonding agent employed.

Example 3

Using an injection molded plate of methacrylate resin, tradenamed "PARAPET GH-S" manufactured by and available from Kuraray Co., Ltd., as the second member and an acrylic film, tradenamed "ACRYPLEN" manufactured by and available from Mitsubishi Rayon Co., Ltd., as the first member, the energy rays were irradiated in a manner substantially identical with that in Example 1 to bond them together. Measurement after the energy rays irradiation has indicated that the adhesive strength of the film of 100 mm in width was 0.18 kgf (1.8 N), and it has thus been found that the films could be satisfactorily bonded together without any bonding agent employed.

Example 4

Using a sheet prepared from pellets of ethylene ionomer resin, tradenamed "HIMILAN 1555" manufactured by and available from DU PONT-MITSUI POLYCHEMICALS Co., Ltd., as the second member and a polyethylene film as the first member, the energy rays were irradiated in a manner substantially identical with that in Example 1 to bond them together. Measurement after the energy rays irradiation has indicated that the adhesive strength of the film of 100 mm in width was 0.34 kgf (3.3 N), and it has thus been found that the films could be satisfactorily bonded together without any bonding agent employed.

Example 5

Using an extrusion molded film of acrylic core shell microparticles as the second member and a polyurethane (TPU) sheet, tradenamed "Kuramilon U3190) manufactured by and available from Kuraray Co., Ltd., as the first member, the energy rays were irradiated in a manner substantially identical with that in Example 1 to bond them together. Measurement after the energy rays irradiation has indicated that the adhesive strength of the film of 100 mm in width was 0.08 kgf (0.78 N), and it has thus been found that the films could be satisfactorily bonded together without any bonding agent employed.

Example 6

Using two sheets of styrene elastomer compound, tradenamed "SeptonCPD KC009A" manufactured by and available from Kuraray Plastics Co., Ltd. as the first and second members, respectively, the energy rays were irradiated in a manner substantially identical with that in Example 1 to bond them together. Measurement after the energy rays irradiation has indicated that the adhesive strength of the sheet of 100 mm in width was 0.10 kgf (0.98 N), and it has thus been found that the sheets could be satisfactorily bonded together without any bonding agent employed.

Example 7

Using a triacetylcellulose film, tradenamed "FUJITAC UV-CM 80 μm" manufactured by and available from Fuji Photo Film Co., Ltd., as the first member and a commercially available vinylon film, identified by #3000 and manufactured by and available from Kuraray Co., Ltd., as the second member, the energy rays were irradiated in a manner substantially identical with that in Example 1 to bond them together. Measurement after the energy rays irradiation has indicated that the adhesive strength of the film of 100 mm in width was 0.08 kgf (0.78 N), and it has thus been found that the films could be satisfactorily bonded together without any bonding agent employed.

Example 8

Using an commercially available acrylic film, tradenamed "ACRYPLEN" manufactured by and available from Mitsubishi Rayon Co., Ltd. as the first member was irradiated with energy rays in a manner substantially identical with that in Example 1 and was subsequently bonded with a plate glass as the second member. Measurement after the energy rays irradiation has indicated that the adhesive strength of the film of 100 mm in width was 0.05 kgf (0.49 N), and it has thus been found that the film and the plate glass could be satisfactorily bonded together without any bonding agent employed.

Comparative Examples 1 to 8

Except that in place of the xenon lamp, "UER 200/HM172" manufactured by and available from USHIO U-TECH INC. and capable of emitting energies of 7.3 eV, used therein, a high pressure mercury lamp, tradenamed "UM 452" manufactured by and available from USHIO INC., and capable of emitting energies of 3.5 eV, was used as a source of energy rays in Examples 1 to 8 demonstrated above, lamination was conducted in a manner similar to that in each of Examples 1 to 8, followed by measurement of the adhesive strength of the resultant laminate by means of the 90° peel strength test. The measurement has indicated that in each of Comparative Examples 1 to 8, the adhesive strength with 100 mm in width was found to be lower than 0.01 kgf (0.10 N), and it has thus been found that no satisfactory adhesive strength was exhibited.

Comparative Examples 9 to 16

Except that no irradiation of the energy rays was effected, lamination was conducted in a manner similar to that in each of Examples 1 to 8. Although the 90° peel strength test was tried in each of Comparative Examples 9 to 16 to determine the adhesive strength, no adhesive strength was measured and, thus, the measurement was not successful.

Another preferred embodiment of the present invention associated with the method of making a planar light source device will now be described in detail. In the practice of this planar light source device making method, an optical film and/or a light guide element made of a transparent synthetic resin such as, for example, an acrylic resin, a polycarbonate resin or the like are irradiated with the previously discussed the energy rays for the surface modification. In other words, at least one of the light guide element and the optical film is subjected to the surface modification by the irradiation with the energy rays having an energy not lower than 4 eV and the light guide element and the optical film are then bonded together to achieve a firm adhesion. The surface modification is preferably conducted under the previously discussed atmosphere and, also, optimization of the atmosphere in which the energy irradiation is carried out and the length of the irradiating time is further preferred.

According to this alternative embodiment of the present invention, a pattern of surface irregularities formed on the optical film used as one member of integral members for the planar light source device includes hills and dales. The hills of the surface irregularities referred to above may have any suitable sectional shape, for example, a parabolic shape, a triangular shape or the like. Also, the pattern of the surface irregularities may be formed deployed in either one dimension in which the surface irregularities are formed in one direction, or two dimension in which the surface irregularities are formed in two directions. As a method of forming the optical film, an extrusion molding method, an injection molding method, and a press molding method using a thermoplastic resin, a 2P molding method using a photo-curable resin or the like is available in the art. Formation of the optical film using any one of those methods requires the use of a mold assembly having a pattern of surface irregularities that is a replica of the pattern of surface irregularities eventually formed on the optical film. For a base material that defines a rear side of the pattern of surface irregularities during the execution of the 2P molding method, the use of a film of acrylic resin, polycarbonate resin, polyvinyl chloride resin, cellulose triacetate resin, polyester resin or the like is recommendable.

The structure of the planar light source device manufactured by the use of the integral members for the planar light source device according to this alternative embodiment is schematically shown in FIG. 1. As shown therein, the planar light source device includes a light guide element 21 having its opposite ends provided with an elongated light source 22 such as, for example, a cold cathode fluorescent lamp or the like, and an optical film 23 formed with a pattern of surface irregularities as an array of microprisms for controlling a distribution of angle of emission of light from the light guide element 21. Although in FIG. 1 respective ridges of the hills of the surface irregularities on the optical film 23 are shown as deployed so as to extend parallel to an end face of the light guide element 21 adjacent the position of the light source 22, the pattern of the surface irregularities may be deployed in two dimensions. The elongated light source 22 is enclosed by a similarly elongated reflector for reflecting portion of the rays of light, then traveling from the light source 22 in a direction away from the end face of the light guide element 21, back towards such end face of the light guide element 21. The rays of light entering the light guide element 21 through that end face thereof propagates within the light guide element 21 while undergoing a total reflection within it. The rays of light so propagating are subsequently transmitted into the optical film through a joint between the hills of the surface irregularities on the optical film 23 and a light exit surface of the light guide element 21. Accordingly, the rays of light propagating within the light guide element 21 successively travel from the joint between the hills of the surface irregularities on the optical film 23 into the optical film 23 and are, after having undergone the total reflection within the hills of the surface irregularities on the optical film and then collected thereby, emitted outwardly from the planar light source device.

The structure similar to that of the planar light source device shown in and described with reference to FIG. 1 is disclosed in and is therefore known from, for example, the U.S. Pat. No. 5,396,350. However, in the practice of the present invention, when the light guide element and the optical film are bonded together during the manufacture of the planar light source device, the light guide element 21 is irradiated with ultraviolet rays having an energy not lower than 4 eV, prior to the light guide element 21 being bonded to the optical film, to thereby modify the surface of the light guide element 21. Subsequently, the optical film 23 is pressed against the light guide element by the application of a suitable laminating pressure so that vertexes of the hills of the surface irregularities on the optical film 23 can be anchored to the adjacent surface of the light guide element 21. Thus, no intermediate layer of any bonding agent or an adhesive agent need be formed between the light guide element 21 and the optical film 23.

Because of the reason discussed above, according to the present invention, not only can the process of making the planar light source device be advantageously and efficiently simplified, but also the resultant planar light source device is less free from reduction in light transmittance which would otherwise occur in the presence of the intermediate layer between the light guide element and the optical film. When the planar light source device utilizing the optical film 23 in accordance with the embodiment shown in and described with reference to FIG. 1 is used as a backlighting apparatus with its light exit surface provided with a transmission type display element, an image display device can readily be obtained. For the transmission type display element, a liquid crystal panel of a STN, TFT or MINI type can be enumerated.

Hereinafter, the present invention will be demonstrated by way of examples in connection with the method of making the planar light source device. It is, however, to be noted that those examples are not intended to limit the scope of the present invention, but are intended to provide only for illustration purpose.

Example 9

In this Example, as a source of energy rays, a commercially available xenon lamp, tradenamed "UER 200/HM172" manufactured by and available from USHIO U-TECH INC. and capable of emitting energies of 7.3 eV, was used. For the light guide element, an injection molded plate of methacrylate resin, tradenamed "PARAPET GH-S" manufactured by and from Kuraray Co., Lts. was used, 160 mm in widht, 100 mm in length and 4 mm in thickness.

The surface modification of the light guide element was carried by the following manner.

The xenon lamp and the light guide element were spaced an accurate distance of 2 mm therebetween and the latter was irradiated with the ultraviolet rays of an energy of 7.3 eV for 30 seconds. To ascertain the result of the surface modification, the angle of contact between the light guide element and water was measured by the use of a contact angle meter, tradenamed "Model CA-DT•A" manufactured by and available from KYOWA INTERFACE SCIENCE CO., LTD., and as a result thereof it has been found that the measured contact angle which had been 70° prior to the surface modification was reduced down to 23° (Temperature: 25° C., Relative Humidity: 50%).

The optical film having a two dimensional pattern of surface irregularities, that is, a two dimensional array of microprisms was prepared by the following manner: Using as a mold assembly a nickel plate formed with a pattern of surface irregularities that is a replica of the pattern of surface irregularities to be eventually formed on the optical film, a photocurable acrylate resin, tradenamed "KAYARAD" manufactured by and available from NIPPON KAYAKU CO., LTD., was filled in the mold assembly and, using a film of polycarbonate resin, 0.2 mm in thickness, of a kind manufactured by and available from Mitsubishi Engineering-Plastics Corporation, as a base film, the photo-curable resin was cured to provide the optical film. The resultant optical film and the light guide element were laminated by the application of a laminating pressure of 0.3 kgf/cm$^2$ (0.03 MPa) to provide integral members for the planar light source device. In this resultant planar light source device, it has been found that the percentage of the contact area of the vertexes of the surface irregularity pattern on the optical film with the light guide element was found to be 30%.

The 90° peel strength test was also conducted to determine the adhesive strength between the optical film and the light guide element both forming respective parts of the integral members for the planar light source device. The measurement of the 90° peel strength test has revealed that the adhesive strength of the optical film, 50 mm in width, relative to the light guide element was 0.09 kgf (0.88 N).

Figure 2:
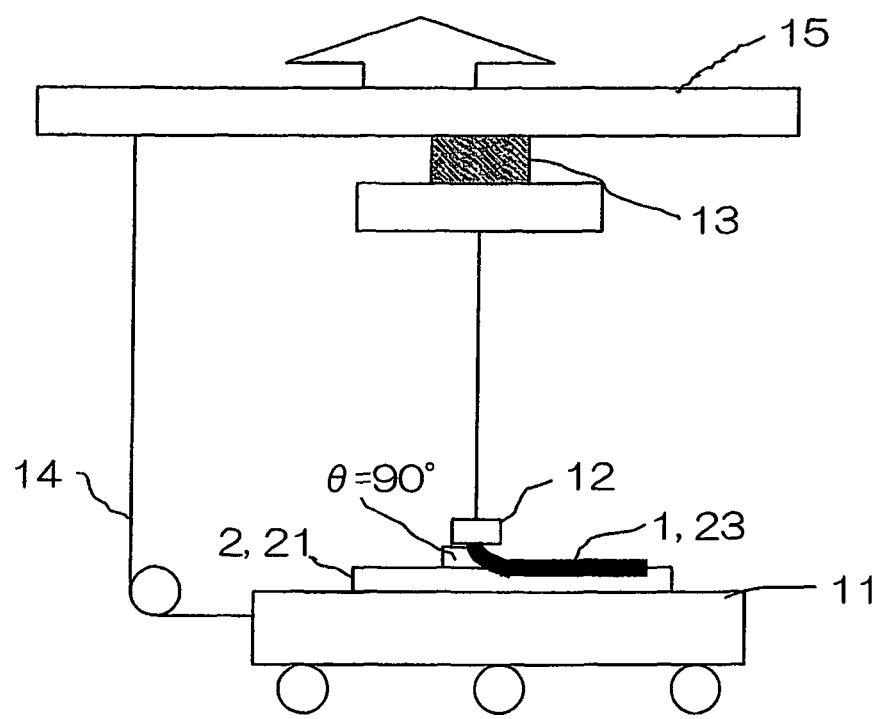
FIG. 2 is a schematic explanatory diagram showing a method of conducting a peel strength test at right angle to determine the adhesive strength.

This 90° peel strength test conducted was similar that shown in and discussed with reference to FIG. 2. More specifically, in the planar light source device of the structure in which the light guide element 21 and the optical film 23 were laminated together in the manner described hereinabove, using a lamination sample having a predetermined width of the optical film 23, the light guide element 21 was placed on the movable table 11 of the adhesion measuring apparatus. Also, after one end piece of the optical film 23 has been peeled from the light guide element 21 and was attached to the peeling jig 12 of the same adhesion measuring apparatus. The peeling jig 12 is operatively coupled with the pulling arm 15 through the load cell 13 so that the tensile stress (adhesive strength) can be measured during exfoliation of the base. During this measurement, the pulling speed was set to 300 mm/min. Since the movable table 11 is connected with the pulling arm 15 through the connecting element 14 such as, for example, a string, the movable table 11 can move leftwards, as viewed in FIG. 2, a distance equal to the distance over which the peeling jig 12 is moved upwardly. Accordingly, the optical film 23 can be peeled at a peel angle of 90° at all times during the measurement relative to the light guide element 21.

Example 10

In a manner similar to that in Example 9, the light guide element was irradiated with energy rays and, also, the surface modification was carried out in a manner similar to that in Example 9 to the optical film prepared in a manner similar to that in Example 9 and having the pattern of surface irregularities in the form of an array of microprisms. The optical film and the light guide element, both having been subjected to the surface modifying treatment, were laminated together by the application of a laminating pressure of 0.3 kgf/cm$^2$ (0.03 MPa) to provide the integral members for the planar light source device. The adhesive strength of this integral members was measured in a manner similar to that in Example 9 according to the 90° peel strength test. The measurement has indicated that the adhesive strength of the optical film of 50 mm in width was 0.15 kgf (1.5 N).

Example 11

In this Example, a commercially available low pressure mercury lamp, tradenamed "Model HMW-615N" manufactured by and available from Kabushiki Kaisha Oak of Japan was used for surface modification of the light guide element. Specifically, this surface modification was carried out by the following manner.

The low pressure mercury lamp and the light guide element were spaced an accurate distance of 10 mm therebetween and the latter was irradiated with the ultraviolet rays of an energy of 6.0 eV for 200 seconds. To ascertain the result of the surface modification, the angle of contact between the light guide element and water was measured by the use of a contact angle meter, tradenamed "Model CA-DT•A" manufactured by and available from KYOWA INTERFACE SCIENCE CO., LTD., and as a result thereof it has been found that the measured contact angle was reduced down to 42° (Temperature: 25° C., Relative Humidity: 50%).

The optical film having the array of microprisms was prepared in a manner similar to that in Example 9.

The resultant optical film and the light guide element having its surface modified were laminated by the application of a laminating pressure of 0.3 kgf/cm$^2$ (0.03 MPa) to provide integral members for the planar light source device. The adhesive strength between the optical film and the light guide element both used in this integral members for the planar light source device was measured in a manner similar to that in Example 9 according to the 90° peel strength test. The measurement has indicated that the adhesive strength of the optical film of 50 mm in width was 0.06 kgf (0.59 N).

Example 12

In this Example, a commercially available corona discharge device, manufactured by and available from NAVITAS CO., LTD., was used for the irradiation with energy rays. This surface modification was carried out by the following manner.

The corona discharge device and the light guide element were spaced a distance of 5 mm therebetween and, with the line speed chosen to be 100 mm/sec., the light guide element was treated under the air by a corona discharge of 5.0 eV in energy. To ascertain the result of the surface modification, the angle of contact between the light guide element and water was measured by the use of a contact angle meter, tradenamed "Model CA-DT • A" manufactured by and available from KYOWA INTERFACE SCIENCE CO., LTD., and as a result thereof it has been found that the measured contact angle was reduced down to 45° (Temperature: 25° C., Relative Humidity: 50%).

The optical film having the array of microprisms was prepared in a manner similar to that in Example 9.

The resultant optical film and the light guide element having its surface modified were laminated by the application of a laminating pressure of 0.3 kgf/cm² (0.03 MPa) to provide integral members for the planar light source device. The adhesive strength between the optical film and the light guide element both used in this integral members for the planar light source device was measured in a manner similar to that in Example 9 according to the 90° peel strength test. The measurement has indicated that the adhesive strength of the optical film of 50 mm in width was 0.06 kgf (0.59 N).

Comparative Example 17

The optical film was prepared in a manner similar to that in Example 9, and this optical film and the light guide element were subsequently surface modified under the air for 30 seconds by irradiation with ultraviolet rays emitted from the high pressure mercury lamp, tradenamed "UM452" manufactured by and available from USHIO INC. and capable of emitting energies of 3.5 eV. The optical film and the light guide element, both having been subjected to the surface modifying treatment, were laminated together by the application of a laminating pressure of 0.3 kgf/cm² (0.03 MPa) to provide integral members for the planar light source device. The adhesive strength between the optical film and the light guide element both used in this integral members for the planar light source device was measured in a manner similar to that in Example 9 according to the 90° peel strength test. The measurement has indicated that the adhesive strength of the optical film of 50 mm in width was lower than 0.01 kgf (0.10 N) and, thus, it is clear that with the surface modification conducted by irradiation with the energy rays of lower than 4 eV in energy, no strong adhesive strength can be obtained.

Comparative Example 18

In a manner similar to that in Example 9, the optical film was prepared and was subsequently laminated with the light guide element, which has not been surface modified, by the application of a laminating pressure of 0.3 kgf/cm² (0.03 MPa). However, lamination was not successful and the light guide element and the optical film could not be integrated together. Measurement of the contact angle between the light guide element, which has not been subjected to the surface modification, and the optical film, when conducted in a manner similar to that in Example 9, has revealed 70°. Thus, it is clear that without the surface modification conducted on the light guide element, the optical film and the light guide element cannot be bonded together.

Comparative Example 19

In a manner similar to that in Example 9, the optical film was prepared and was subsequently laminated with the light guide element with the use of a transparent bonding agent by the application of a laminating pressure of 0.3 kgf/cm² (0.03 MPa) to provide the integral members for the planar light source device. The adhesive strength between the optical film and the light guide element both used in this integral members for the planar light source device was measured according to the 90° peel strength test. The measurement has indicated that the adhesive strength of the optical film of 50 mm in width was 0.16 kgf (1.6 N) and, thus, the resultant integral members had a sufficient adhesive strength.

On the other hand, however, when the cold cathode fluorescent lamps were disposed respectively along opposite long sides of the integral members for the planar light source device and were subsequently energized to emit light, the brightness of light measured at a front center portion of the integral members was found to be lower by a quantity of 3% as compared with that exhibited at a similarly front center portion of the integral members obtained in each of Examples 9 to 12 discussed above. In other words, it can readily be understood that lamination of the optical film and the light guide element by the use of the bonding agent gives rise to a lower efficiency of utilization of light than that exhibited by the laminate having no bonding layer.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A method of making integral members for a planar light source device, the method comprising:
   irradiating one of opposite surfaces of a first member made of a plastic material, that is to be bonded with a second member, with energy rays having quantum energy not lower than 4 eV; and
   directly bonding the first and second members together at room temperature after the irradiating without any bonding agent being used,
   wherein respective mating surfaces of the first and the second members are not melted when bonding,
   wherein:
   the first member comprises a light guide element for propagating rays of light from a light source towards a light exit surface thereof; and
   the second member comprises an optical film disposed on the light exit surface of the light guide element;
   and forming a plurality of projections operable to transmit rays of light from the light exit surface of the light guide element towards a front surface region of the light exit surface, on one of opposite surfaces of the optical film that confronts the light guide element;

wherein the light guide element is directly bonded with the optical film at vertexes of the plural projections.

2. A method of making integral members for a planar light source device, the method comprising:

irradiating one of opposite surfaces of a first member made of a plastic material, that is to be bonded with a second member, with energy rays having quantum energy not lower than 4 eV; and directly bonding the first and second members together at room temperature after the irradiating without any bonding agent being used, wherein respective mating surfaces of the first and the second members are not melted when bonding, wherein:

the second member comprises a light guide element for propagating rays of light from a light source towards a light exit surface thereof; and the first member comprises an optical film disposed on the light exit surface of the light guide element;

and forming a plurality of projections operable to transmit rays of light from the light exit surface of the light guide element towards a front surface region of the light exit surface, on one of opposite surfaces of the optical film that confronts the light guide element;

wherein the light guide element is directly bonded with the optical film at vertexes of the plural projections.

3. A method of making integral members for a planar light source device, the method comprising:

irradiating one of opposite surfaces of a first member made of a plastic material, that is to be bonded with a second member, with energy rays having quantum energy not lower than 4 eV; and directly bonding the first and second members together at room temperature after the irradiating without any bonding agent being used, wherein respective mating surfaces of the first and the second members are not melted when bonding, and wherein one of opposite surfaces of the second member that is to be bonded with the first member is irradiated with the energy rays having quantum energy not lower than 4 eV;

wherein:

the first member comprises a light guide element for propagating rays of light from a light source towards a light exit surface thereof; and the second member comprises an optical film disposed on the light exit surface of the light guide element;

and forming a plurality of projections operable to transmit rays of light from the light exit surface of the light guide element towards a front surface region of the light exit surface, on one of opposite surfaces of the optical film that confronts the light guide element;

wherein the light guide element is directly bonded with the optical film at vertexes of the plural projections.

4. The method according to claim 1, wherein a contact area between the first and the second member is at least 30%.

5. The method according to claim 2, wherein a contact area between the first and the second member is at least 30%.

6. The method according to claim 3, wherein a contact area between the first and the second member is at least 30%.

7. The method according to claim 1, wherein a surface of the first member opposite to the second member is irradiated.

8. The method according to claim 2, wherein a surface of the first member opposite to the second member is irradiated.

9. The method according to claim 3, wherein a surface of the first member opposite to the second member is irradiated.

10. The method according to claim 1, wherein the second member to be bonded with the first member is made of a plastic material.

11. The method according to claim 2, wherein the second member to be bonded with the first member is made of a plastic material.

12. The method according to claim 3, wherein the second member to be bonded with the first member is made of a plastic material.

* * * * *